(12) United States Patent
Nabeiro et al.

(10) Patent No.: US 12,478,075 B2
(45) Date of Patent: *Nov. 25, 2025

(54) ENHANCED COMPACTED TABLET AND SYSTEM FOR EXTRACTION OF BEVERAGES COMPRISING SAID COMPACTED TABLET

(71) Applicant: NOVADELTA-COMÉRCIO E INDÚSTRIA DE CAFÉS, LDA, Lisbon (PT)

(72) Inventors: Rui Miguel Nabeiro, Campo Maior (PT); Carla Rodrigues, Ribafria (PT)

(73) Assignee: NOVADELTA—COMÉRCIO E INDÚSTRIA DE CAFÉS, LDA, Lisbon (PT)

( * ) Notice: Subject to any disclaimer, the term of this patent is extended or adjusted under 35 U.S.C. 154(b) by 528 days.

This patent is subject to a terminal disclaimer.

(21) Appl. No.: 17/783,554

(22) PCT Filed: Nov. 20, 2020

(86) PCT No.: PCT/PT2020/050046
§ 371 (c)(1),
(2) Date: Jun. 8, 2022

(87) PCT Pub. No.: WO2021/118377
PCT Pub. Date: Jun. 17, 2021

(65) Prior Publication Data
US 2023/0016608 A1    Jan. 19, 2023

(30) Foreign Application Priority Data
Dec. 9, 2019 (PT) .......................................... 115960

(51) Int. Cl.
*A23F 5/12* (2006.01)
*A47J 31/36* (2006.01)

(52) U.S. Cl.
CPC ........... *A23F 5/125* (2013.01); *A47J 31/3676* (2013.01)

(58) Field of Classification Search
CPC ....... A23F 5/125; A23P 10/28; A47J 31/3676; A47J 31/4492
(Continued)

(56) References Cited

U.S. PATENT DOCUMENTS 6,068,871 A * 5/2000 Fond .................. B65D 85/8046
426/77
2023/0017219 A1* 1/2023 Nabeiro .................. A23F 5/125

FOREIGN PATENT DOCUMENTS

CH        303 264 A    11/1954
EP     0 006 175 A1    1/1980
(Continued)

OTHER PUBLICATIONS

International Search Report for PCT/PT2020/050046 dated Feb. 15, 2021 [PCT/ISA/210].
(Continued)

*Primary Examiner* — Brent T O'Hern
(74) *Attorney, Agent, or Firm* — Sughrue Mion, PLLC (57) ABSTRACT

A compacted coffee tablet (1), in particular a tablet of compacted roast and ground coffee beans, presenting an advantageous configuration in terms of compaction process, maintenance of shape and efficiency of coffee extraction, in particular of espresso type coffee. A beverage preparation systems including the compacted coffee tablet (1).

18 Claims, 5 Drawing Sheets

(58) Field of Classification Search
USPC .......................................................... 426/595
See application file for complete search history.

(56)  References Cited

FOREIGN PATENT DOCUMENTS

EP          0 229 920 A1    7/1987
WO       2009/081250 A2    7/2009

OTHER PUBLICATIONS

Written Opinion for PCT/PT2020/050046 dated Feb. 15, 2021 [PCT/ISA/237].

* cited by examiner

ENHANCED COMPACTED TABLET AND SYSTEM FOR EXTRACTION OF BEVERAGES COMPRISING SAID COMPACTED TABLET

CROSS REFERENCE TO RELATED APPLICATIONS

This application is a National Stage of International Application No. PCT/PT2020/050046 filed Nov. 20, 2020, claiming priority based on Portugal Patent Application No. 115960 filed Dec. 9, 2019.

FIELD OF THE INVENTION

The present invention refers to the field of compacted tablets for preparing beverages, in particular of roasted and ground coffee beans, as well as to beverage preparation systems including said compacted tablets.

BACKGROUND OF THE INVENTION

The prior art includes several documents relating to compacted ground coffee tablets. Said compacted coffee tablets present several constrains in its industrial production, notably in terms of the shapes that can be obtained.

The form of said compacted tablets can play an important role in the preparation of a beverage, in particular in the case of espresso type coffee, or similar. In fact, can be important to provide a cavity on the upstream-oriented side so as to enable a temporary accumulation of beverage inside a package associated with said tablet, for example in the form of a two-sheet film-like envelope.

The document EP 0229920 B1 discloses a process for producing coffee tablets comprising the application of a pressure between 20.7 and 48.3 MPa to a mass of particles of roast and ground coffee with at least 3%, in particular between 3% and 6% in mass, and an average particle dimension between 0.4 mm and 2.0 mm, in particular between 0.6 mm and 1.2 mm. The process further includes coating the exterior of the compacted table with an edible material, dispersible in water, whereby said coating includes humidification with aqueous liquid and the application of dry solids.

The document U.S. Pat. No. 6,068,871 discloses a beverage preparation from a tablet compacted substance, with the general shape of a disc. Said tablet can present an upstream-oriented portion, a downstream-oriented portion and an intercalary portion, whereby said portions extend along similar extension along the prevailing flow direction. Moreover, said tablet can present a cavity arranged in centred manner in at least one of the upstream and downstream-oriented faces. In particular, the tablet can present a cavity only of spherical shape and extending along the entire upstream-oriented face of said upstream-oriented portion.

The document WO2008/123775 A1 discloses a method for producing a coffee tablet, and a coffee tablet obtained by means of said method. Said coffee tablet can present a generally irregular shape.

None of the documents in the prior art discloses a compacted coffee tablet presenting a structural configuration that provides optimization of the structural resistance and, therefore, of the quantity of material used.

GENERAL DESCRIPTION OF THE INVENTION

The objective of the present invention is to provide compacted coffee tablets that present better dimensional and functional characteristics.

In particular, said compacted coffee tablet should present a better general configuration, so as to present better structural resistance and better exposition of the coffee volume to the upstream flow, as well as a better configuration of the upstream-oriented portion, so as to contribute to the extraction of coffee, in particular of roasted and ground coffee beans, in the preparation of coffee based beverages, for example of the espresso coffee type.

This objective is attained according to the present invention by means of a compacted coffee tablet according to claim 1, whereby preferred embodiments are disclosed in the depending claims.

In particular, the compacted coffee tablet according to the invention presents an upstream cavity that is different from the downstream cavity, including with a different extension along the prevailing flow direction.

Said upstream cavity can be contained in an upstream-oriented portion and said downstream cavity can be contained in a downstream-oriented portion, whereby the upstream and downstream-oriented portions of the compacted coffee tablet are separated by an intercalary portion.

Said downstream-oriented portion can present a downstream cavity that is arranged in centred manner and extends along only part of the transversal dimension of said downstream-oriented portion, so that the perimeter region of the downstream cavity presents a part extending along a transversal direction to the exterior perimeter region of said downstream-oriented portion.

Moreover, the compacted coffee tablet according to the invention presents at least the most part, preferentially at least 60%, particularly preferentially at least 70% of the compacted coffee volume in a region that extends transversally up until the total height, including in said intercalary portion and/or a second smaller part, preferentially of at most 30%, particularly preferentially of at most 20% of the compacted coffee volume, is in a region that extends transversally to a dimension smaller than the total width, including on said upstream-oriented portion.

The compacted coffee tablet according to the invention can present a relation between total width and total height of at most 5:1, preferentially of at most 4:1.

An associated objective is to provide a compacted coffee tablet presenting a given quantity of ground coffee that presents better physical properties in view of the extraction efficacy and of the physical stability of the compacted tablet.

In particular, it is advantageous when the quantity of ground coffee is comprised between 4 and 8 grams, preferentially between 5 and 7 grams, particularly preferentially between 5.3 and 6.7 grams, and said quantity of coffee beans presents a humidity content comprised between 1 e 5% in mass, preferentially between 2 and 4% in mass.

Moreover, it is advantageous when said quantity of coffee corresponds to ground coffee presenting granulometry distribution with at least 90% of the particles with an average dimension comprised between 100 μm and 3000 μm, preferentially with at least 85% of the particles with an average dimension comprised between 250 μm and 2000 μm.

Another associated objective is to provide a compacted coffee tablet that presents a better distribution of at least a greater part of the mass of coffee with relation to the prevailing flow direction, and, therefore, better extraction efficacy of said mass of coffee.

This objective is solved according to the present invention by means of a compacted coffee tablet that presents the most part of the mass of coffee in an intercalary portion that extends up to the total exterior dimension, the direction transversal to the prevailing flow direction.

Another associated objective is to provide a beverage preparation system that presents a compacted coffee tablet and that provides more advantages in the preparation of beverages, such as for example espresso type coffee.

This objective is solved according to the present invention by means of a system according to claim 16.

The system can comprise at least one type of compacted coffee tablet and at least one type of envelope confining at least one said compacted coffee tablet, whereby said types of tablet can vary in at least one of: mass of compacted ground coffee, volume of tablet and configuration of at least one of the upstream and downstream oriented portions, and whereby said types of enveloped can vary in at least one of: material, type, shape and dimension of the envelope of tablet.

DESCRIPTION OF THE FIGURES

The invention shall be hereinafter explained in greater detail based upon preferred embodiments and the attached Figures.

The Figures show, in simplified schematic representations.

DETAILED DESCRIPTION OF PREFERRED EMBODIMENTS OF THE INVENTION

FIGS. 1 to 4 reproduce representative views of a first embodiment of a tablet (1) according to the present invention.

Said tablet (1) corresponds to a volume of coffee grounds that has been compacted so as to keep a corresponding three-dimensional form. Said volume corresponds to a regular geometry, including geometry that is rotation symmetric with relation to a central longitudinal axis (XX).

In particular, the tablet (1) can present a quantity, or mass, of coffee ground, previously roasted and compacted, and presenting a general shape and dimension adapted so that said tablet (1) can be used as an individual portion (10) in the preparation of an aromatic beverage. In particular, said individual portion (10) is adapted so that can be supplied to an extraction device and operated therein in the preparation of coffee based beverage, such as for example espresso-type coffee.

Said tablet (1) presents a transversal section with a total width ($D_T$) and generally symmetric with relation to a central longitudinal axis (XX), and is configured so that presents an upstream-oriented portion (11) and a downstream-oriented portion (12), with relation to a prevailing flow direction, and further presents an intercalary portion (13) that extends between said upstream and downstream-oriented portions (11, 12) and in at least the most part of its extension, in the prevailing flow direction, and along said total width ($D_T$).

As represented, said individual portion (1) can present a generally circular transversal section, so that the individual portion (1) presents a general disk-like shape, or similar.

Figure 1:
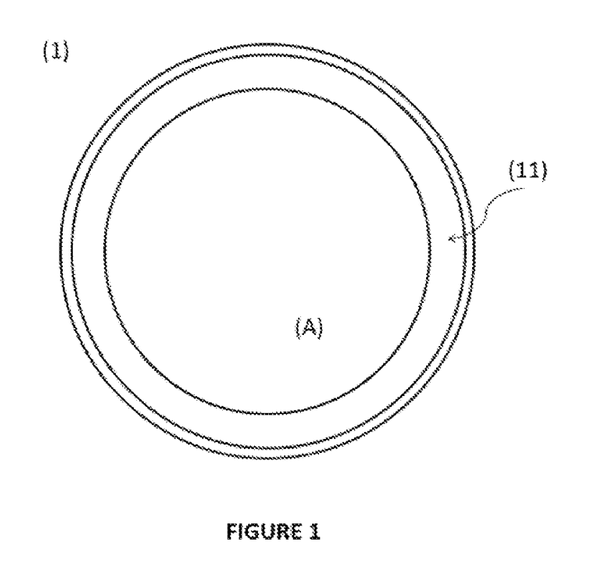
FIG. 1: top view of a first embodiment of tablet (1) according to the present invention.
Figure 2:
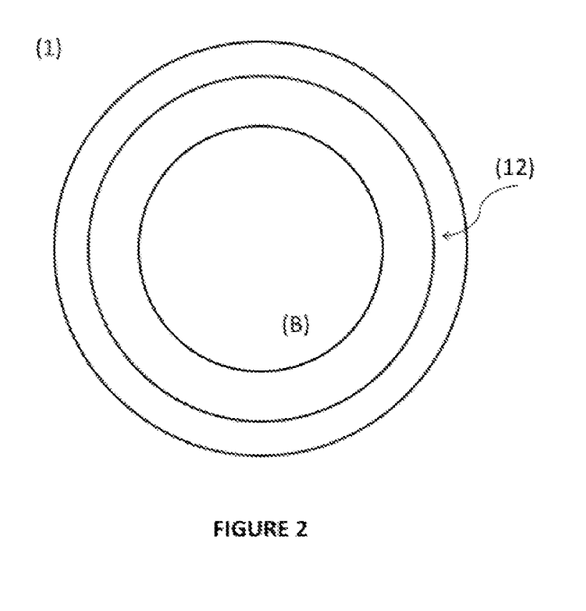
FIG. 2: bottom view of a first embodiment of tablet (1) according to the present invention.
Figure 4:
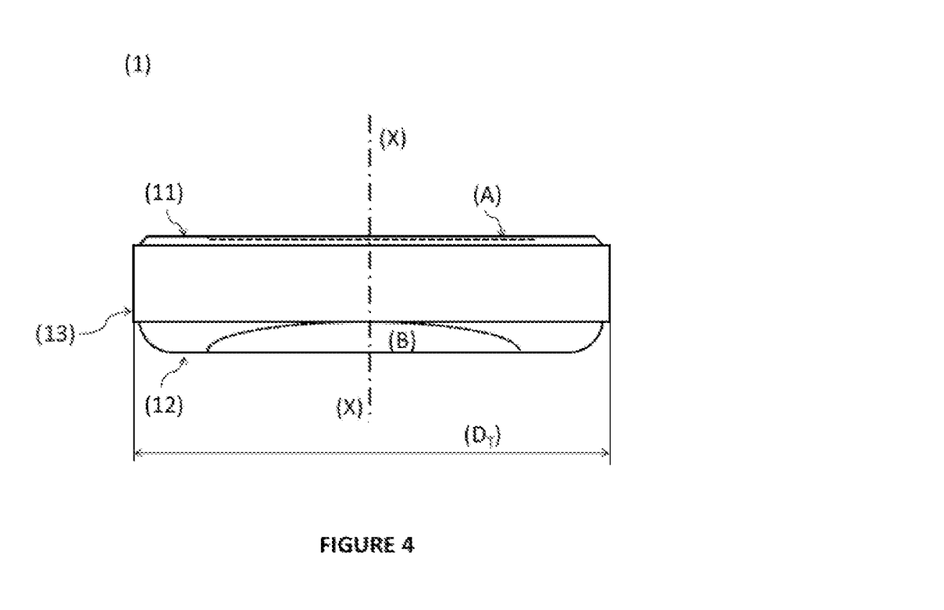
FIG. 4: side-cut view of the embodiment of tablet (1) according to FIG. 3.

According to an aspect of the invention, and as can be seen in particular in FIGS. 2 and 4, said upstream-oriented portion (12) presents an upstream cavity (B) that extends in centred manner from the upstream-oriented surface of the upstream-oriented portion (12).

In particular, as represented in the drawing of FIG. 4, the downstream cavity (B) extends along only part of the transversal dimension of said downstream-oriented portion (12), so that the perimeter region of said downstream cavity (B) presents a part extending a long an at least approximately transversal direction up to the exterior perimeter region of said downstream-oriented portion (12).

In terms of the structural resistance of the tablet, it has been determined as advantageous when the characteristic dimension, for example diameter, of the downstream cavity (B) in the downstream-oriented surface does not exceed 95%, preferentially does not exceed 90% of the corresponding characteristic dimension measured on the same plane, for example diameter, of the perimeter edge of said downstream-oriented surface of said downstream-oriented portion (12).

On the other hand, in terms of extraction of beverage, is has been demonstrated as advantageous when the characteristic dimension of the downstream cavity (B) is of at least 40%, preferentially of at least 40% of the characteristic dimension of the downstream-oriented surface of said downstream-oriented portion (12).

A cavity and a closed chamber are herewith advantageously provided, together with at least one of: a package wall of said tablet (1), and a wall of the extraction device, whereby the beverage resulting downstream can temporarily accumulate. Moreover, said downstream cavity (B) is configured so that extends along only part of the downstream-oriented surface of said tablet (1), not occupying the entire transversal extension thereof.

In particular, said downstream-oriented portion (12) can present a perimeter region of downstream cavity (B) that extends between the downstream cavity (B) and the exterior perimeter region of said downstream-oriented portion (12), along an at least approximately similar extension, preferentially bigger extension than the extension of the exterior perimeter region.

It is preferred when the exterior perimeter region of said downstream-oriented portion (12) presents a transversal dimension smaller than said total width ($D_T$), whereby the transition from the downstream-oriented portion (12) to said intercalary portion (13) preferentially includes a surface that extends along an at least approximately transversal direction.

Moreover, it is preferred when the exterior edges of said downstream-oriented portion (12) are rounded with a curvature radius comprised between 1 and 6 mm, preferentially between 2 and 5 mm.

It is herewith advantageously provided a reinforcement of the structural resistance of the tablet (1) when submitted to the force of hydraulic pressure of said pressurized flow of extraction, along a prevailing flow direction that is at least approximately orthogonal with relation to the biggest extension of volume of the tablet (1), i.e., with relation to the total width ($D_T$).

In the case of a preferred embodiment (not represented), said downstream-oriented portion (12) can present a perimeter region of the downstream cavity (B) only of rounded shape, devoid of plane surfaces, said downstream perimeter region being preferentially configured with a rounded shape at least approximately in continuous curved connection with said downstream cavity (B).

As represented in FIG. 4, said upstream-oriented portion (11) can present at least one upstream cavity (A) that can extend in centred manner. Said upstream cavity (A) can extend until said intercalary portion (13), and further additionally inwards of said intercalary portion (13), so as to promote an initial infiltration of the pressurized fluid in the volume of compacted coffee.

Figure 3:
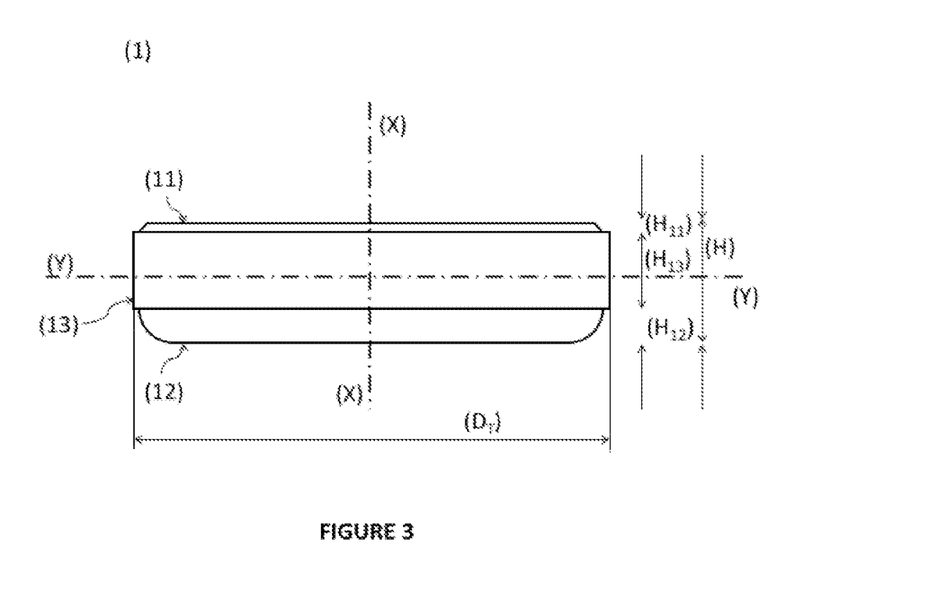
FIG. 3: side view of a first embodiment of tablet (1) according to the present invention.

According to another aspect of the present invention, and as can be observed in FIG. 3, the tablet (1) is configured so that the most part of the volume of compacted coffee is in a region that extends transversally to the total width ($D_T$), including in said intercalary portion (13), and a second smaller part of the volume of compacted coffee is in a region that extends transversally to a dimension smaller than the total width ($D_T$), including in said upstream-oriented portion (11).

Moreover, it is very advantageous when the tablet (1) presents a relation between total width ($D_T$) and total height (H) of at most 5, preferentially of at most 4.

Moreover, it is advantageous when said intercalary portion (13) extends along at least the most part of the total height ($H_T$) of tablet (1), and said intercalary portion (13) configures angled perimeter transitions, in particular reductions of width, at an towards said upstream (11) and downstream portions (12), preferentially including at an angle of at least approximately 90°.

A greater structural resistance of the compacted coffee tablet is herewith provided. Moreover, it is herewith provided a greater relative fraction of the total coffee mass with exposition along a maximum transversal dimension ($D_T$) to the prevailing infusion flow direction, thereby contributing to a greater extraction efficacy of the coffee beverage.

Figure 5:
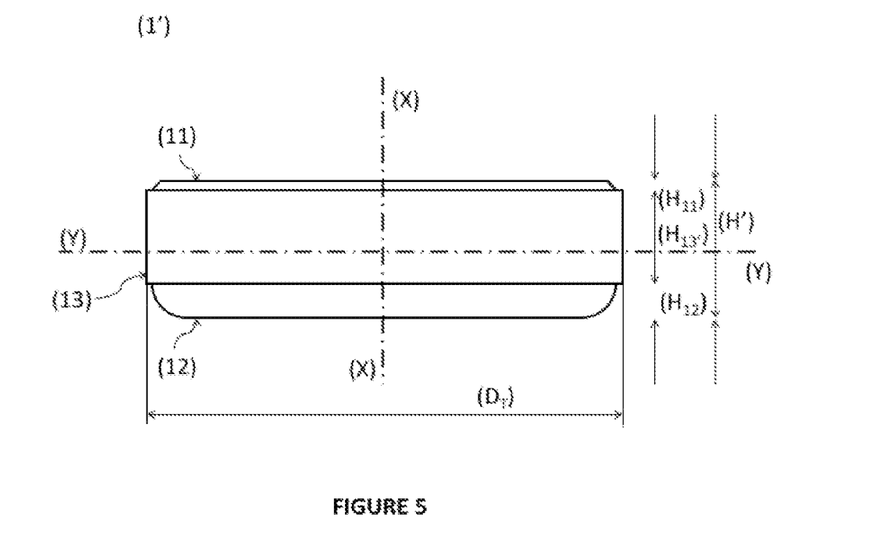
FIG. 5: side view of a second embodiment of tablet (1) according to the present invention.
Figure 6:
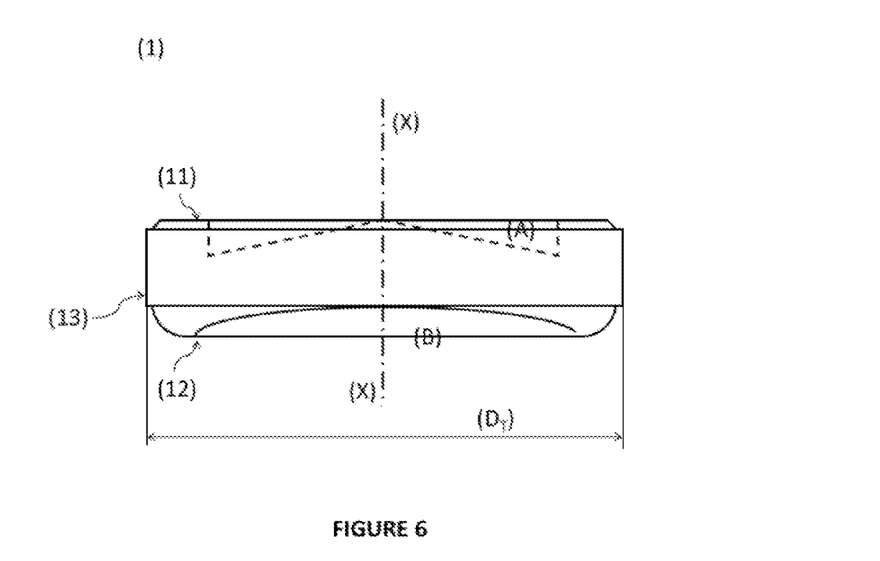
FIG. 6: side-cut view of the embodiment of tablet (1) according to FIG. 5.

FIGS. 3 and 4 represent a first embodiment of the tablet (1) according to the present invention, whereby the upstream-oriented portion (11) presents an upstream cavity (A) that only extends on said upstream-oriented portion (11) and does not extend downstream to the region of the intercalary portion (13), whereas the FIGS. 5 and 6 represent a second embodiment of tablet (1') according to the present invention whereby the upstream cavity (A) extends downstream to the region of the intercalary portion (13). In the first case, the upstream cavity (A) can present a cylindrical shape whereas in the second case can present a conic shape.

It has been demonstrated as advantageous when the downstream cavity (B) presents a semi-spherical, spherical-cap, or ovoid-like shape.

Moreover, the second embodiment presents a tablet (1') with a total height (H') that is bigger than the total height (H) associated with the tablet (1) of said first embodiment.

In particular, a beverage preparation system according to the present invention can include at least two types of tablets (1, 1') presenting different heights (H), and similar heights of upstream and downstream portions ($H_{11}$, $H_{12}$), so that only varies the height of respective intercalary portions ($H_{13}$). It is further preferred when said types of tablets (1, 1') presents similar total diameters ($D_T$).

The tablet (1) according to the present invention presents a quantity of roasted and ground coffee beans that is compacted in a compaction process that includes providing said quantity of previously roasted and ground coffee beans to a compaction mold presenting an interior shape and dimensions corresponding to the tablet (1) according to the present invention.

Said quantity of coffee grounds is advantageously comprised between 4 and 8 grams, preferentially between 5 and 7 grams, particularly preferentially between 5.3 and 6.7 grams, whereas said quantity of coffee grounds presents a humidity content comprised between 1 and 5% in mass, preferentially between 2 and 4% in mass.

Moreover, it has been demonstrated as particularly advantageous in tests that have been carried out when said quantity of coffee corresponds to granulated coffee presenting a granulometry distribution with at least 90% of particles with an average dimension comprised between 100 μm and 3000 μm, preferentially with at least 85% of the particles with an average dimension between 250 μm and 2000 μm.

Figure 7:
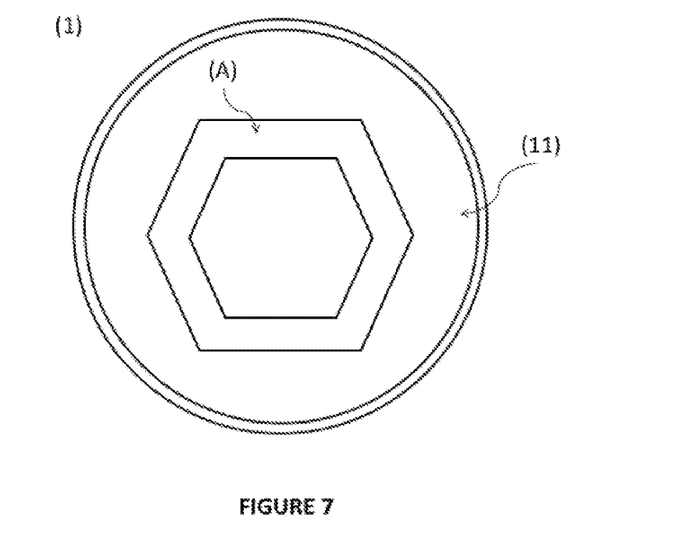
FIG. 7: top view of a first embodiment of the upstream cavity (A) in a tablet (1) according to the present invention.
Figure 8:
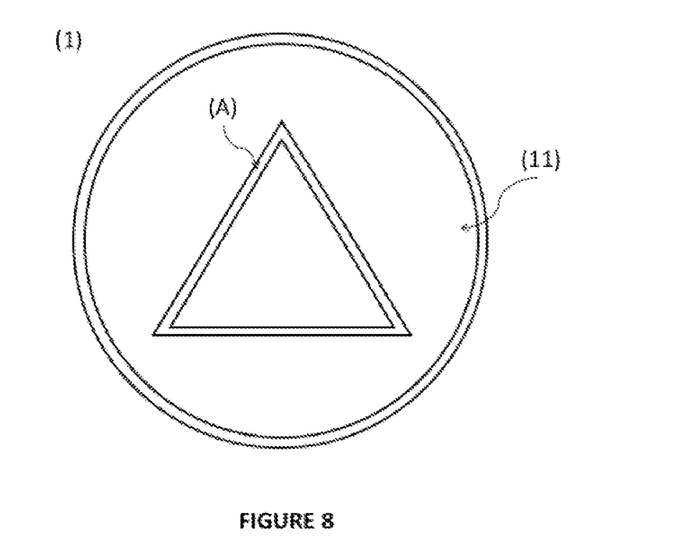
FIG. 8: top view of a second embodiment of the upstream cavity (A) in a tablet (1) according to the present invention.

FIGS. 7 and 8 represent two preferred embodiments of the upstream cavity (A) provided on the upstream-oriented surface of the upstream-oriented portion (11).

Said at least one upstream cavity (A) can advantageously present an exterior perimeter corresponding to a geometric shape different from a circle, when seen in top view. In particular, said shape can correspond to at least one of: a polygon and an unclosed line (not represented in the drawings).

It has been demonstrated as advantageous when the upstream cavity (A) that extends along at least one closed alignment confined by an exterior perimeter and an interior perimeter, both extending at the face of the upstream surface of said upstream-oriented portion (11). The upstream cavity (A) can herewith provide a preferential entry region of the upstream pressurized flow, favouring the orientation of its crossing of the compacted coffee tablet (1).

In the case of the represented embodiments, said upstream cavity (A) can confine the cavity between an exterior perimeter and an interior perimeter, whereby said exterior and interior perimeters can advantageously present a geometric shape at least approximately similar, when seen in top view.

In beverage preparation systems known in the prior art, it is known the use of beverage preparation apparatuses adapted so that can collect an individual portion, for example of roast and ground coffee, so as to prepare a beverage, for example of espresso type coffee.

Figure 9:
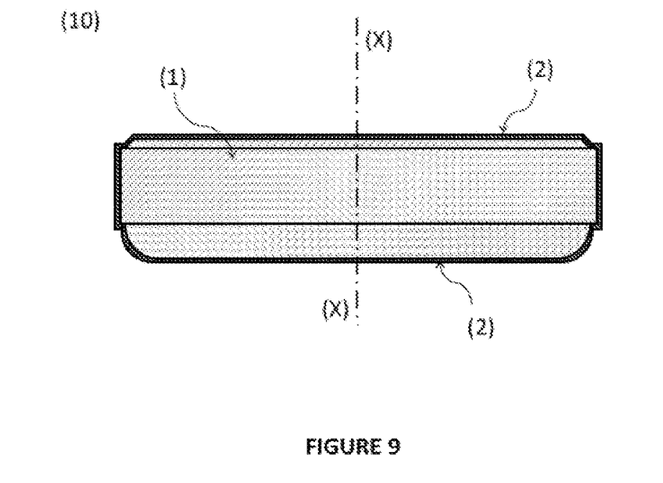
FIG. 9: side view of a first embodiment of an individual portion (10) including a first type of tablet (1) according to the present invention.
Figure 10:
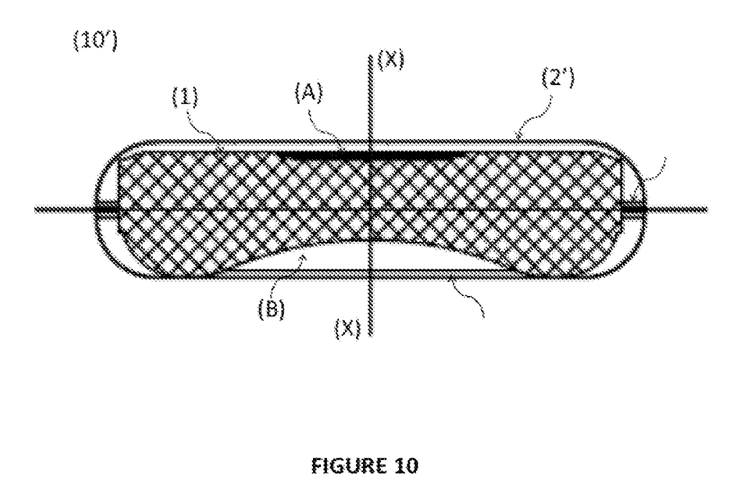
FIG. 10: side view of an embodiment of a second type of individual portion (10') including a second type of tablet (1') according to the present invention.

FIGS. 9 and 10 represent two types of individual portions (10, 10') including a compacted coffee tablet (1, 1').

In the case of a first type represented in FIG. 9, the individual portion (10) presents a compacted coffee tablet (1), in particular a tablet (1) presenting a general configuration according to the presenting invention, and an envelope (2) in the form of an edible coating that provides gas barrier and can dissolve when exposed to a temperature of at least 50° C., preferentially of at least 60° C. Said edible coating is advantageously provided in a layer of at least approximately uniform configuration around the whole exterior surface of the tablet (1), preferentially so that the edible coating layer at least approximately follows the contour surface of at least one of respective upstream (A) and downstream (B) cavities is also coated by said edible coating.

In the case of a second type represented in FIG. 10, said individual portion (10') presents a tablet (1) and an envelope of a non-edible material, in particular of a synthetic material, provided so that confines said cavities (A, B), but not following the shape contour thereof.

The downstream cavity (B) in this case advantageously provides an extraction chamber, and the envelope (2) is preferentially configured, at least on the upstream-oriented side, so that temporarily retains the beverage flow that accumulated on said downstream cavity (B) against the retention of said envelope (2) until reaching a previously defined pressure value. There are known several embodiments of this type of envelope in the prior art so that one abdicates in this circumstance of a more detailed description thereof.

The invention claimed is:

1. A tablet for preparing edible products, the tablet comprising:
    a volume and a quantity of compacted ground coffee,
    a side cross-section having a total width ($D_T$) and a symmetric shape with relation to a central longitudinal axis (XX);
    an upstream-oriented portion and a downstream-oriented portion, with relation to a prevailing flow direction; and
    an intercalary portion that extends between said upstream-oriented portion and said downstream-oriented portion and at least a portion defining said total width ($D_T$),
    wherein the downstream-oriented portion comprises a downstream cavity (B) that has a curved surface extending inwardly, and
    wherein a perimeter region of said downstream cavity (B) extends to an exterior perimeter region of the downstream-oriented portion.

2. The tablet according to claim 1, wherein the downstream-oriented portion is configured so as to present at least one of:
    an exterior perimeter region of said downstream-oriented portion including a surface that is curved, and that extends from a proximity of the perimeter region of the downstream cavity (B) to the intercalary portion,
    the perimeter region of the downstream cavity (B) extending between the curved surface of the downstream cavity (B) and the surface of the exterior perimeter region of the downstream-oriented portion, and
    an extension of the perimeter region of the downstream cavity (B) between the downstream cavity (B) and the exterior perimeter region of the downstream-oriented portion, is similar to or smaller than an extension of the exterior perimeter region.

3. The tablet according to claim 1, wherein the downstream-oriented portion is configured so as to present at least one of:
    an exterior perimeter region of the downstream-oriented portion having a transversal dimension smaller than the total width ($D_T$), whereby a transition surface between the downstream-oriented portion and the intercalary portion extends along an at least approximately transversal direction, and
    external perimeter edges of the downstream-oriented portion are rounded with a curvature radius between 1 and 6 mm.

4. The tablet according to claim 1, wherein the downstream cavity (B) is configured so as to present at least one of:
    a semi-spherical shape that extends between at least 50% and at most 75% of the total width ($D_T$), or
    a characteristic dimension measured on a downstream-oriented surface of the downstream-oriented portion no larger than 90% of a corresponding characteristic dimension measured on a same plane of a perimeter edge of the downstream-oriented surface of the downstream-oriented portion next to the intercalary portion.

5. The tablet according to claim 1, wherein the upstream-oriented portion comprises at least one upstream cavity (A) disposed in a centered manner and that can extend at least until the intercalary portion, and
    wherein the at least one upstream cavity (A) occupies at least one of: a shape of linear type confining an area, and a shape of area type.

6. The tablet according to claim 1, wherein
    at least one of the upstream-oriented portion and the downstream-oriented portion comprises at least one respective cavity extending downstream and upstream, respectively, wherein:
    said respective cavities have different cavity volumes;
    said respective cavities have different transversal extensions;
    said respective cavities have different configurations; or
    at least one of said respective cavities extends towards the intercalary portion.

7. The tablet according to claim 1, wherein
    the tablet is configured so as to present at least one of the following:
    at least 60% of the volume of the compacted ground coffee is in a region that extends transversally until the total width ($D_T$), including on said intercalary portion;
    at most 30% of the volume of the compacted ground coffee is in a region that extends transversally up to a smaller dimension than the total width ($D_T$), including on said upstream-oriented portion;
    a relation between the total width ($D_T$) and a total height of the tablet is at most 5:1.

8. The tablet according to claim 1, wherein
    the intercalary portion extends along a majority of a total height ($H_T$) of the tablet, and
    the intercalary portion comprises perimeter transitions at an angle towards said upstream-oriented portion and said downstream-oriented portion.

9. The tablet according to a claim 1, wherein
    the tablet present at least one of:
    an asymmetric configuration, in terms of geometric shape with relation to a central transversal plane (YY), such that said intercalary portion extends in an uneven manner with relation thereto;
    an asymmetric configuration, in terms of total mass with relation to the central transversal plane (YY), such that a mass fraction of said intercalary portion upstream thereof is different from the mass fraction of the intercalary portion downstream thereof.

10. The tablet according to a claim 1, wherein
    the tablet comprises at least one of the following configurations:
    exterior side edges of the upstream-oriented portion define a transversal dimension smaller than the total width ($D_T$), whereby a transition of the upstream-oriented portion to the intercalary portion includes an upstream-oriented perimeter surface,
    the upstream-oriented portion presents a surface that extends at least approximately transversally relative to the prevailing flow direction, along at least a portion of an extension of the upstream-oriented portion, the exterior side edges of the upstream-oriented portion are in plane surface inclined at an angle of at least 65° and at most 85° relative to the prevailing flow direction.

11. The tablet according to claim 1, wherein
the tablet presents at least one of the following dimensional relations:
   a total height ($H_T$) between 5 and 10 mm;
   a height ($H_{11}$) of the upstream-oriented portion of at most 2 mm;
   a height ($H_{12}$) of the downstream-oriented portion of at least 2 mm and at most 4 mm;
   a height ($H_{13}$) of the intercalary portion of at most 7 mm, and
the tablet has a granulometry distribution with at least 90% of particles having an average dimension between at least 100 µm and up to 3000 µm.

12. The tablet according to claim 5, wherein
the tablet presents at least one of the following dimensional relations:
   the total width ($D_T$) between 30 and 44 mm;
   a maximum transversal extension of the at least one upstream cavity (A) of the upstream-oriented portion between 5 and 40 mm;
   a maximum transversal extension of the downstream cavity (B) between 20 and 30 mm.

13. The tablet according to claim 1, wherein
a region of transition from the upstream-oriented portion and downstream-oriented portion to the intercalary portion includes a surface that extends along a transversal direction and that forms an approximately right angle with an exterior wall of the intercalary portion.

14. The tablet according to claim 1, wherein
the quantity of the compacted ground coffee is between 4 and 8 grams, and said quantity of the compacted ground coffee presents moisture content between 1 and 5% in mass.

15. The tablet according to claim 1, wherein
the quantity of the compacted ground coffee corresponds to granulated coffee having a granulometry distribution with at least 90% of particles having an average dimension between 100 µm and 3000 µm.

16. A system for preparing edible products including:
the tablet according to claim 1,
an envelope configured to provide a gas barrier and confine the tablet;
wherein
said tablet can vary in at least one of: mass of the compacted ground coffee, volume of the tablet and configuration of at least one of the upstream-oriented portion and downstream-oriented portion, and
said envelope can vary in at least one of: material, type, shape and dimension.

17. The system according to claim 16, wherein
the envelope is at least one of:
   an edible material that follows a contour of the tablet;
   a non-edible material provided to confine the tablet but not following the contour thereof, and
the individual portion comprises at least one envelope support whereby said envelope support is configured to confine at least one of:
   a single individual portion;
   a plurality of individual portions disposed successively along said envelope support.

18. The system according to claim 16, wherein
the envelope is configured to provide for recognition of at least one characteristic associated with said upstream-oriented portion and said downstream-oriented portion, including by at least one of: a user, mechanical means of supply of said individual portion to an extraction device, and automatic recognition means.

* * * * *